United States Patent [19]

Minoura et al.

[11] Patent Number: 4,720,077

[45] Date of Patent: Jan. 19, 1988

[54] FUEL INJECTION VALVE

[75] Inventors: Mikio Minoura; Shoji Ito, both of Obu, Japan

[73] Assignee: Aisan Kogyo Kabushiki Kaisha, Obu, Japan

[21] Appl. No.: 942,685

[22] Filed: Dec. 22, 1986

[30] Foreign Application Priority Data

Dec. 28, 1985 [JP] Japan ............................... 60-297919

[51] Int. Cl.[4] ............................................ F16K 31/02

[52] U.S. Cl. ............................ 251/129.06; 239/102.2; 239/584

[58] Field of Search ................ 251/129.06; 239/102.2, 239/584

[56] References Cited

U.S. PATENT DOCUMENTS 3,614,486 10/1971 Smiley ........................ 251/129.06 X 4,101,076 7/1978 Bart .................................... 239/584

FOREIGN PATENT DOCUMENTS 2094940 9/1982 United Kingdom ........... 251/129.06

OTHER PUBLICATIONS

SAE Technical Paper Series No. 800502, p. 10, FIG. 16.

Proceedings of the 5th Meeting on Ferroelectric Materials and their applications (1985), 30-V-2, (including translation).

*Primary Examiner*—Arnold Rosenthal

*Attorney, Agent, or Firm*—Dennison, Meserole, Pollack & Scheiner

[57] ABSTRACT

A fuel injection valve using a stacked piezoelectric ceramics displacement magnifying device as a valve actuator. The piezoelectric actuator comprises a stacked piezoelectric ceramics expandable upon application of an electric field thereto; a lever member having a base portion fixed to the central portion of the casing, an inner portion contacting with an end of the stacked piezoelectric ceramics and receiving an expansion force from the stacked piezoelectric ceramics, a fulcrum portion fixed to the base portion, and at least two outer portions adapted to be outwardly displaced when the inner portion receives the expansion force from the stacked piezoelectric ceramics; and a flexing member formed of an elastic material and connected at its both ends to the outer portions of the lever member under the condition where a central portion thereof is flexed frontwardly, the central portion of the flexing member being connected to a rear end of the valve body.

5 Claims, 6 Drawing Figures

FUEL INJECTION VALVE

BACKGROUND OF THE INVENTION

The present invention relates to a fuel injection valve for an internal combustion engine, and more particularly to a fuel injection valve using a stacked piezoelectric ceramics displacement magnifying device as an valve actuator.

The stacked piezoelectric ceramics is constituted of a plurality of stacked ceramics elements displaceable upon application of an electric field thereto. The amount of displacement (distorsion) of the stacked ceramics elements varies with the strength of electric field. As the product of the displacement and a force generated is relatively large, and responsiveness is remarkably high, the stacked piezoelectric ceramics is used as a high-responsive actuator in various fields.

However, the amount of displacement of the stacked piezoelectric ceramics is small, and therefore, an actuator having the stacked piezoelectric ceramics combined with a displacement magnifying device is being developed. Such an piezoelectric actuator including a displacement magnifying device is described in SAE Technical Paper Series No. 800502 Page 10, FIG. 16 and Proceedings of the 5th Meeting on Ferroelectric Materials and Their Applications (1985) 30-V-2, for example. There have been proposed three types of the displacement magnifying device as shown in FIGS. 4 to 6.

Referring to FIG. 4 which shows a first type of the displacement magnifying device, a flexing member 1 is formed of an elastic strip which is easily flexible in a horizontal direction shown, but is hardly expandable in a vertical direction shown. The flexing member 1 is installed under a preliminarily flexed condition as shown. When the flexing member 1 under the condition is pulled vertically by a stacked piezoelectric ceramics, a central portion of the flexing member 1 is greatly displaced in the horizontal direction.

Referring to FIG. 5 which shows a second type of the displacement magnifying device, levers 6 and 7 are connected through hinges 4 and 5 to a fixed member 3, respectively. The levers 6 and 7 are connected with each other through a hinge 8. When the lever 6 is upwardly urged by a stacked piezoelectric ceramics 2, the lever 7 is rotated clockwise about the hinge 5. Accordingly, an upper end of the lever 7 is greatly displaced.

Referring to FIG. 6 which shows a third type of the displacement magnifying device, pistons 9 and 10 are inserted into two cylinders connected to each other and having different sectional areas, and an uncompressible hydraulic fluid F is filled in a space between both the pistons 9 and 10. When the piston 9 having a larger sectional area is urged by a stacked piezoelectric ceramics 2, the piston 10 having a smaller sectional area is greatly displaced.

However, in the case that the conventional displacement magnifying device using the stacked piezoelectric ceramics is used for the actuator of the fuel injection valve, the construction of the displacement magnifying device is required to be compact and elongated along an output displacement axis in accordance with a cylindrical configuration of the fuel injection valve having a valve body at a front end portion thereof. In the first type device as shown in FIG. 4, the length of the flexing member 1 cannot be sufficiently ensured, and a large magnification ratio cannot be obtained. In the second type device as shown in FIG. 5, a displacement output point is positioned at an edge of the device, and therefore, a displacement magnifying function cannot be sufficiently provided. In the third type device as shown in FIG. 6, the length of the device along the output displacement axis is large, and precise working is required, causing increased costs. Further, the hydraulic fluid F tends to vaporize at high temperatures, thereby hindering a valve operation.

SUMMARY OF THE INVENTION

It is a primary object of the present invention to provide a fuel injection valve including a piezoelectric actuator which may be made compact and exhibit a large magnification ratio.

It is another object of the present invention to provide a fuel injection valve which may improve responsiveness in fuel control.

It is a further object of the present invention to provide a fuel injection valve which may attain precise fuel metering in an internal combustion engine.

It is a still further object of the present invention to provide a fuel injection valve which may improve emission control.

According to the present invention, there is provided a fuel injection valve comprising a cylindrical casing consisting of a front portion, a central portion and a rear portion; a valve housing fixedly engaged in the front portion of the cylindrical casing; a valve body reciprocatably received in the valve housing for opening and closing an injection nozzle; a piezoelectric actuator inserted in the central portion of the casing for driving the valve body; and a return spring inserted in the central portion of the casing for normally biasing the valve body in a valve closing direction.

The piezoelectric actuator comprises a stacked piezoelectric ceramics expandable upon application of an electric field thereto; a lever member having a base portion fixed to the central portion of the casing, an inner portion contacting with an end of the stacked piezoelectric ceramics and receiving an expansion force from the stacked piezoelectric ceramics, a fulcrum portion fixed to the base portion, and at least two outer portions adapted to be outwardly displaced when the inner portion receives the expansion force from the stacked piezoelectric ceramics; and a flexible member formed of an elastic material and connected at its both ends to the outer portions of the lever member under the condition where a central portion thereof is flexed frontwardly, the central portion of the flexing member being connected to a rear end of the valve body.

The invention will be more fully understood from the following detailed description and appended claims when taken with the drawings.

DETAILED DESCRIPTION OF THE PREFERRED EMBODIMENT

Figure 1:
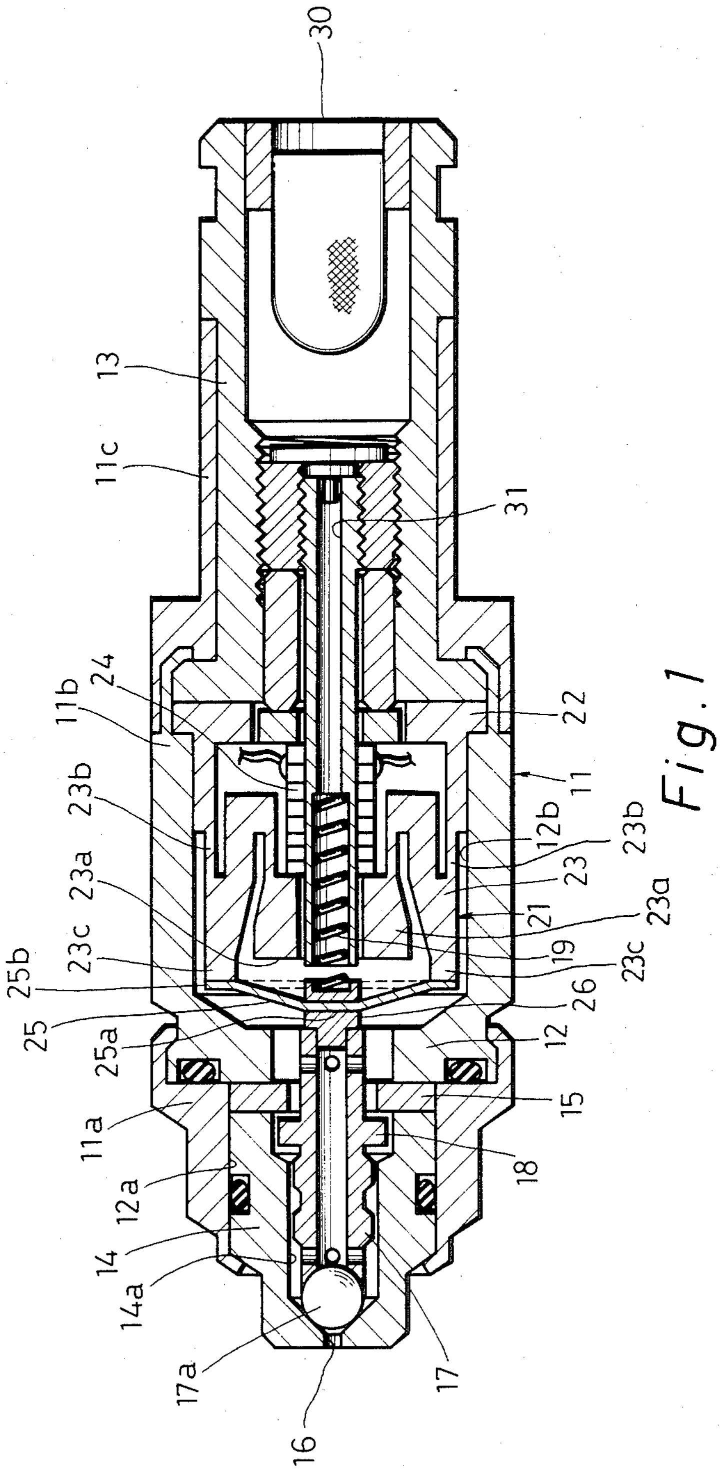
FIG. 1 is a horizontal cross-section of the fuel injection valve including the piezoelectric actuator according to the present invention.
Figure 2:
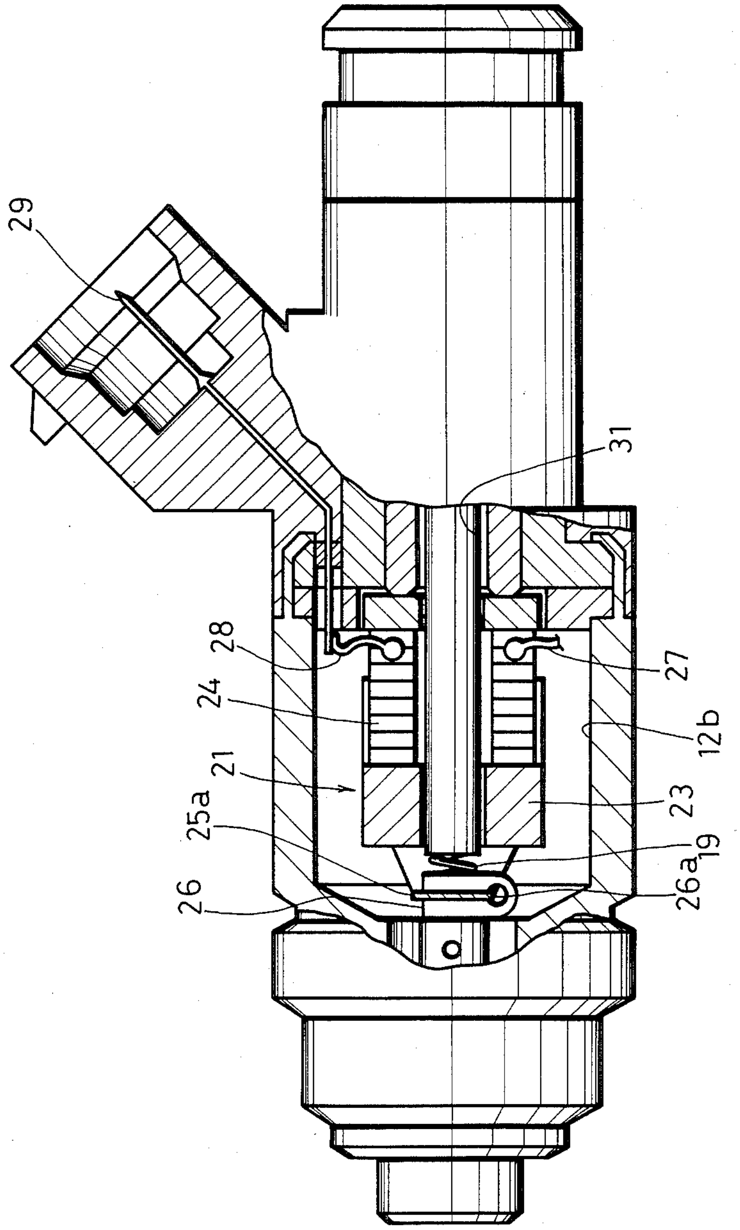
FIG. 2 is a partially sectional side view of the fuel injection valve shown in FIG. 1.
Figure 3:
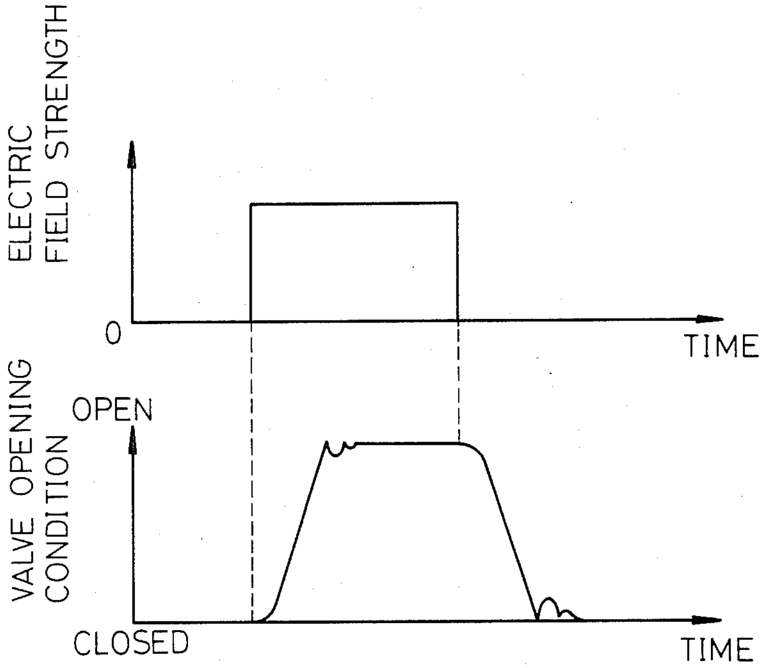
FIG. 3 is a graph showing the relation between a valve opening condition and an electric field strength of the piezoelectric ceramics.
Figure 4:
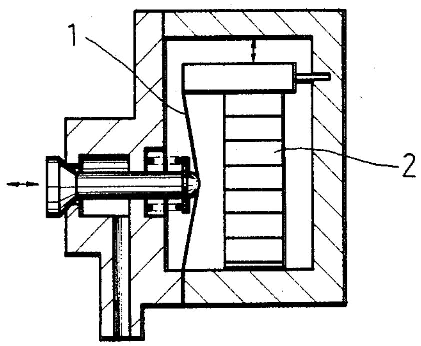
Fig. 4 PRIOR ART
FIGS. 4 to 6 are schematic illustrations of various displacement magnifying devices including stacked piezoelectric ceramics in the prior art.
Figure 5:
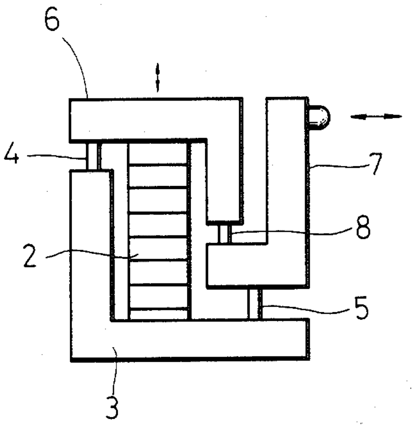
Fig. 5 PRIOR ART
Figure 6:
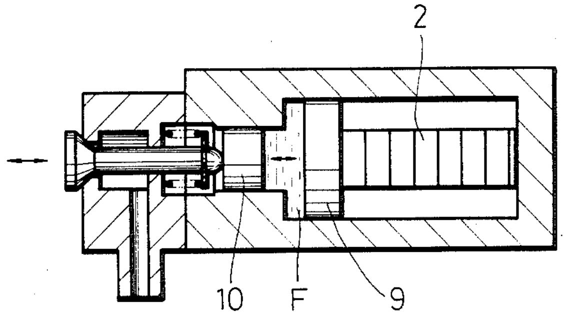
Fig. 6 PRIOR ART

Referring to FIGS. 1 to 3, reference numeral 11 designates a cylindrical casing of the fuel injection valve. The casing 11 is formed by assembling a front portion 11*a*, a central portion 11*b* and a rear portion 11*c*. The central portion 11*b* is formed with a partition wall 12 for partitioning the interior of the front portion 11*a* from that of the central portion 11*b*. The partition wall 12 has a central through-hole. Thus, a front hole chamber 12*a* and a central chamber 12*b* are defined in the front portion 11*a* and the central portion 11*b*, respectively. A fuel passage member 13 is engaged in the interior of the rear portion 11*c*. A valve housing 14 and an annular stopper 15 are fixedly engaged in the front chamber 12*a*. The valve housing 14 is formed at its front end with a fuel injection nozzle 16. A valve body 17 is reciprocatably inserted in a guide hole 14*a* formed in the valve housing 14, and a spherical valve member 14*a* is fixed at a front end of the valve body 17. A circular flange 18 is formed at a central portion of the valve body 17 so as to abut against a stopper 15 at the stroke rear end of the valve body 17.

Reference numeral 21 designates a stacked piezoelectric ceramics displacement magnifying device constituting the piezoelectric actuator according to the present invention. The displacement magnifying device 21 is inserted in the central chamber 12*b* of the casing 11, and is fixed at a base portion 22 thereof. The base portion 22 is integrally formed with a lever member 23 having such a configuration as shown in horizontal cross-section in FIG. 1 and in vertical cross-section in FIG. 2. The lever member 23 includes a pair of inner portions 23*a* for receiving an expansion force from a stacked piezoelectric ceramics 24, a pair of fulcrum portions 23*b* integrally connected with the base portion 22, and a pair of outer portions 23*c* adapted to be outwardly displaced when the inner portions 23*a* receive the expansion force. The piezoelectric ceramics 24 is engaged in a space defined between the base portion 22 and the inner portions 23*a*. A flexing member 25 formed of a spring steel strip is connected at its both ends 25*b* to the outer portions 23*c* of the lever member 23 under the condition where a central portion 25*a* is flexed frontwardly or leftwardly as viewed in FIG. 1. The central portion 25*a* of the flexing member 25 is held in a groove 26*a* of a connecting member 26 fixed to the rear end of the valve body 17. Lead wires 27 and 28 extend from the stacked piezoelectric ceramics 24, and are connected with a terminal 29. A return spring 19 is inserted between the connecting member 26 and the fuel passage member 13 to normally bias the valve body 17 through the connecting member 26. Fuel is supplied from a port 30 through a fuel passage 31 defined in the fuel passage member 13 to the central chamber 12*b*, and is fed through the interior of the valve body 17 to the periphery of the spherical valve member 17*a*.

In operation, when an electric field is not applied to the stacked piezoelectric ceramics 24, the flexing member 25 is maintained in its forwardly flexed condition by a biasing force of the return spring 19 to thereby maintain the valve body 17 in a closed position. When the electric field is applied to the stacked piezoelectric ceramics 24 as shown in FIG. 3, the piezoelectric ceramics 24 is expanded to forwardly urge the inner portions 23*a* of the lever member 23. Accordingly, both the outer portions 23*c* of the lever member 23 are outwardly displaced to thereby outwardly flex both the ends 25*b* of the flexing member 25. As a result, the central portion 25*a* of the flexing member 25 is flexed rearwardly as shown by a dotted line in FIG. 1 to thereby move the valve body 17 to an open position. When the electric field is cut off, the stacked piezoelectric ceramics 24 is returned to its original position, and the flexing member 25 is moved to a solid line shown in FIG. 1 by the biasing force of the return spring 19 through the lever member 23 to thereby move the valve body 17 to its closed position.

Having thus described the preferred embodiment of the invention, it should be understood that numerous structural modifications and adaptations may be made without departing from the spirit of the invention.

What is claimed is:

1. A fuel injection valve comprising:

A. a cylindrical casing comprising a front portion, a central portion and a rear portion;

B. a valve housing fixedly engaged in said front portion of said cylindrical casing;

C. a valve body reciprocatably received in said valve housing for opening and closing an injection nozzle;

D. a piezoelectric actuator inserted in said central portion of said casing for driving said valve body, said piezoelectric actuator comprising a stacked piezoelectric ceramics expandable upon application of an electric field thereto;

a lever member having a base portion fixed to said central portion of said casing, an inner portion contacting with an end of said stacked piezoelectric ceramics and receiving an expansion force from said stacked piezoelectric ceramics, a fulcrum portion fixed to said base portion, and at least two outer portions adapted to be outwardly displaced when said inner portion receives said expansion force from said stacked piezoelectric ceramics; and a flexing member formed of an elastic material and connected at its both ends to said outer portions of said lever member under the condition where a central portion of said flexing member is flexed frontwardly, said central portion of said flexing member being connected to a rear end of said valve body; and E. a return spring inserted in said central portion of said casing for normally biasing said valve body in a valve closing direction.

2. The fuel injection valve as defined in claim 1, further comprising a connecting member for connecting said valve body with said flexing member.

3. The fuel injection valve as defined in claim 2, wherein said connecting member is formed with a groove into which said central portion of said flexing member is fixedly engaged.

4. The fuel injection valve as defined in claim 1, wherein said flexing member is formed of a spring steel strip.

5. A fuel injection valve comprising:

A. a cylindrical casing comprising a front portion, a central portion and a rear portion;

B. a valve housing fixedly engaged in said front portion of said cylindrical casing;

C. a valve body reciprocatably received in said valve housing for opening and closing an injection nozzle;

D. a piezoelectric actuator inserted in said central portion of said casing for driving said valve body, said piezoelectric actuator comprising a stacked piezoelectric ceramics expandable upon application of an electric field thereto;

a lever member contacting with an end of said stacked piezoelectric ceramics and receiving an expansion force from said stacked piezoelectric ceramics; and a flexing member formed of an elastic material and connected to said lever member under the condition where a central portion of said flexing member is flexed frontwardly, said central portion of said flexing member being connected to a rear end of said valve body; and E. a return spring inserted in said central portion of said casing for normally biasing said valve body in a valve closing direction.

* * * * *